May 24, 1932.  P. J. QUINN  1,859,599
HIGHWAY PROTECTIVE FLAG
Filed March 31, 1932
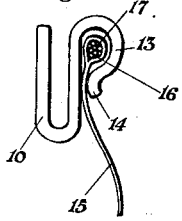
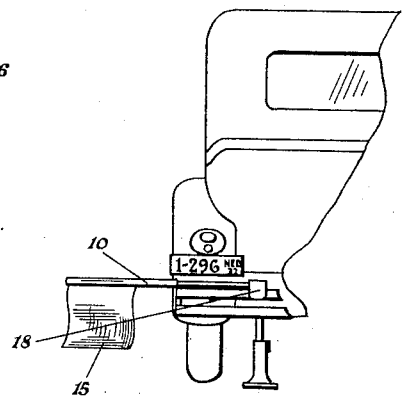
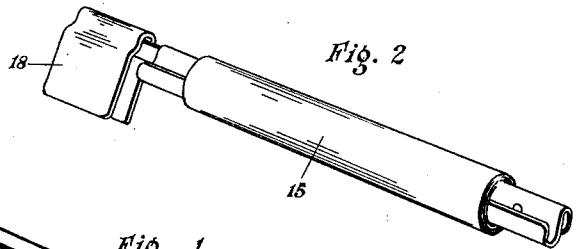
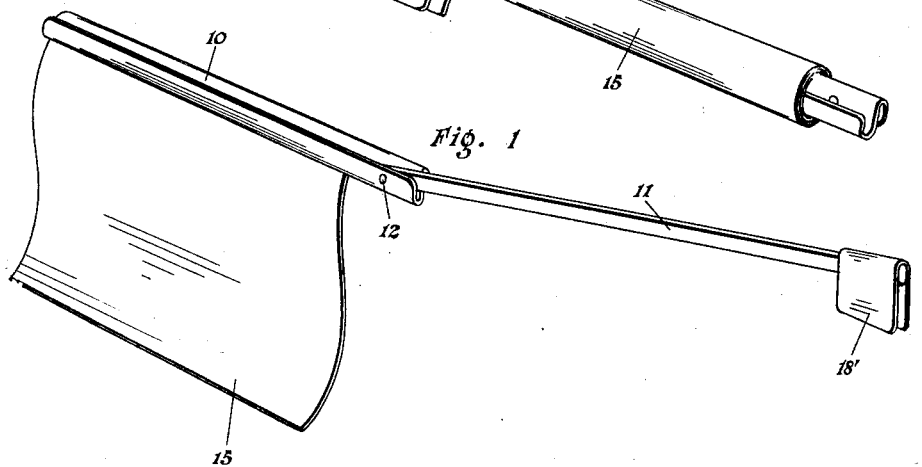
Philip J. Quinn, Inventor
By Emil F. Lange, Attorney Patented May 24, 1932

1,859,599

UNITED STATES PATENT OFFICE

PHILIP J. QUINN, OF LINCOLN, NEBRASKA

HIGHWAY PROTECTIVE FLAG

Application filed March 31, 1932. Serial No. 602,165.

My invention relates to signals, its primary object being the provision of a signal which may be attached to or detached from an automobile at the side of the road to warn the drivers of other cars from approaching too closely.

Another of my objects is the provision of a signal flag having a staff of ample length to protect the driver when he is changing tires or making other repairs at the side of the road.

Another of my objects is the provision of a flag staff which is foldable in jackknife form and which readily remains expanded when in use.

Another of my objects is the provision of a staff having novel means for releasably securing a flag thereto.

Another of my objects is the provision of a resilient clip attached to a flag staff so that the signal flag may readily be attached to the front or rear bumper or to other convenient parts of the automobile.

Having in view these objects and others which will be pointed out in the following description, I will now refer to the drawings, in which Figure 1 is a view in perspective of my flag with the staff partly expanded.

Figure 2 is a perspective view of my flag as it appears when folded up and ready for storage, the attaching clip in Figure 2 showing a slight modification over that shown in Figure 1.

Figure 3 is a view in end elevation or edge view of the flag supporting member of the flag staff, the flag being also shown in edge elevation.

Figure 4 is a view in rear elevation of a fragment of an automobile with my flag attached to the rear bumper of the automobile.

The flag staff itself consists of two parts 10 and 11 which are hinged together at 12 in jackknife fashion. In end view the part 10 is in U form as shown in Figure 3 and it is so dimensioned that the part 11 seats loosely within the channel of the part 10. At either of its edges, the part 10 is rolled at 13, the roll being very slightly outturned at 14, all as shown in Figure 3. The flag 15, which in the present instance is a red or danger signal, is hemmed at 16 about a bundle of fibers 17 to stiffen the inner edge of the flag. The outturned portion 14 is spaced from the body portion of the member 10 a distance sufficient to permit the sliding of the flag 15. The space between these parts is, however, such that no clamping action is permitted between the two parts. The purpose of the outturned portion 14 is to prevent abrasion of a raw edge of the member on the fabric of the flag. The flag 15 is thus tightly held within the looped portion 13 but it may readily be removed by sliding it lengthwise through the looped portion 13. This is important in making it possible to insert a new flag 15 whenever a flag becomes worn or tattered.

The member 11 is provided at its free extremity with a resilient clip 18 which is also in U form but inverted. The clip 18 is secured to the member 11 as by means of welding or by bolting or riveting. The clip 18 is so shaped and dimensioned that it seats snugly in clamping engagement over a bumper of the automobile. The U of the clip 18 is just the reverse of the U of the member 10. By shoving the clip 18 down over the top edge of the bumper, the channel of the member 10 will support the member 11 to prevent the accidental folding of these two members. The weight of the member 10 with the flag is sufficient to maintain the members 10 and 11 in alignment with each other.

A very slight modification is indicated in Figures 1 and 2. The clip 18' of Figure 1 is provided with an inclined free edge, the inclination being downwardly and toward the automobile. This has two advantages over the clip 18. The clip 18' can more readily be started over the top edge of the bumper by beginning at the outer corner of the clip. It also tends to give a slight inclination to the flag staff whose upper and outer end will then be at a slightly higer level than that of the automobile bumper.

The device as a whole is rolled up into the form shown in Figure 2 with preferably a casing or other container to prevent injury to the flag. It is normally kept in the tool box or other convenient place in the automobile. In case of a flat tire or other necessity for repairs, the automobile is halted at the side of the road in the usual manner. Before any repairs are made, however, the flag is unfurled and opened up and then attached to the automobile, preferably to the front or rear bumper. This requires only an instant of time after which the repairs to the car may be made in comparative safety since approaching drivers will naturally avoid the danger signal of a red flag. The flag being stored with the tools is in consequence very convenient of access at just the time when it is needed. After the repairs have been made, the tools are first removed and stored in their usual place and the flag is then removed, folded up and furled after which it is placed back with the tools where it will be available when again needed.

Having thus described my invention in such full, clear, and exact terms that its construction and operation will be readily understood by others skilled in the art to which it pertains, what I claim as new and desire to secure by Letters Patent of the United States is:

1. A flag staff having two pivotally connected sections, one of said sections having means for securing said staff to an automobile to project outwardly therefrom, and means on the outer of said sections for securing a flag thereto.

2. A flag staff of two pivotally connected sections, one of said sections being in U form for receiving the other of said sections or for supporting the other of said sections in alignment therewith, means on said U-formed section for supporting a flag, and means on the other of said sections for attachment to an automobile.

3. A flag staff adapted to be secured to an automobile and including two pivotally connected sections, an elongated looped fold on the outer of said sections, a flag having a hemmed loop at one edge thereof, and a reinforcing member within said hemmed loop, said looped fold of said outer section having an opening extending lengthwise thereof whereby said reinforced hemmed loop may be slid into position within said looped fold.

4. A flag staff adapted to be secured to an automobile to extend outwardly therefrom and including a pair of pivotally connected sections, the outer of said sections being in channeled form to receive the inner of said sections when in closed position, a looped channel at a side of said outer section, said looped channel being provided with a narrow slit extending lengthwise thereof and a narrow outcurved lip adjacent the slit, a flag insertable into said looped channel through an end thereof, said flag having a hemmed edge to prevent its release through the slit, and a resilient clip on the inner of said sections.

5. A flag staff having outer and inner sections, the outer of said sections being channeled into U form for receiving the inner of said sections, said two sections being hingedly connected in jackknife fashion, means on the outer of said sections for supporting a flag, and an inverted U-shaped resilient clip on the outer extremity of the outer of said sections for seating over the upper edge of a bumper of an automobile whereby said two sections will be held in alignment under the weight of said outer section and the flag supported thereby.

In testimony whereof I affix my signature.
PHILIP J. QUINN.